W. F. DRAPER & J. NORTHROP.
AUTOMATIC FILLING REPLENISHING FEELER LOOM.
APPLICATION FILED NOV. 21, 1907.
920,037.
Patented Apr. 27, 1909.
8 SHEETS—SHEET 1.
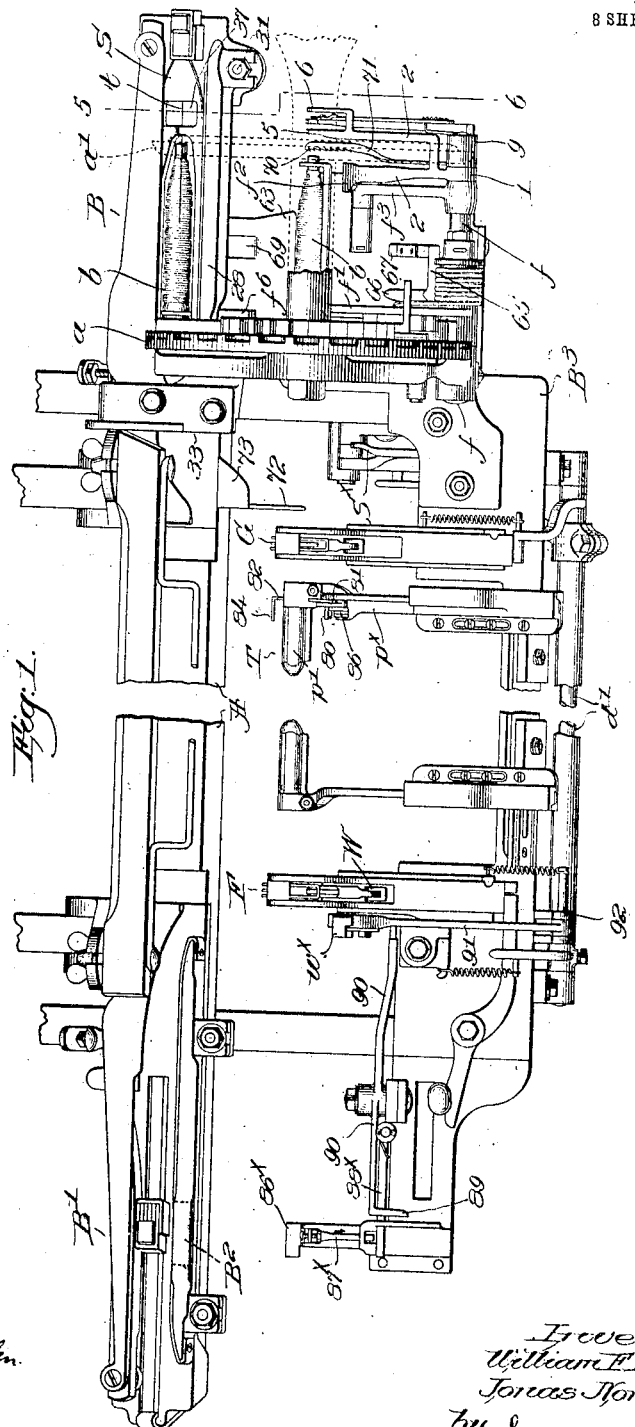
Witnesses,
Edward H. Allen
Joseph M. Ward
Inventors,
William F. Draper
Jonas Northrop
by Crosby Gregory
Attys W. F. DRAPER & J. NORTHROP.
AUTOMATIC FILLING REPLENISHING FEELER LOOM.
APPLICATION FILED NOV. 21, 1907.
920,037.
Patented Apr. 27, 1909.
8 SHEETS—SHEET 2.
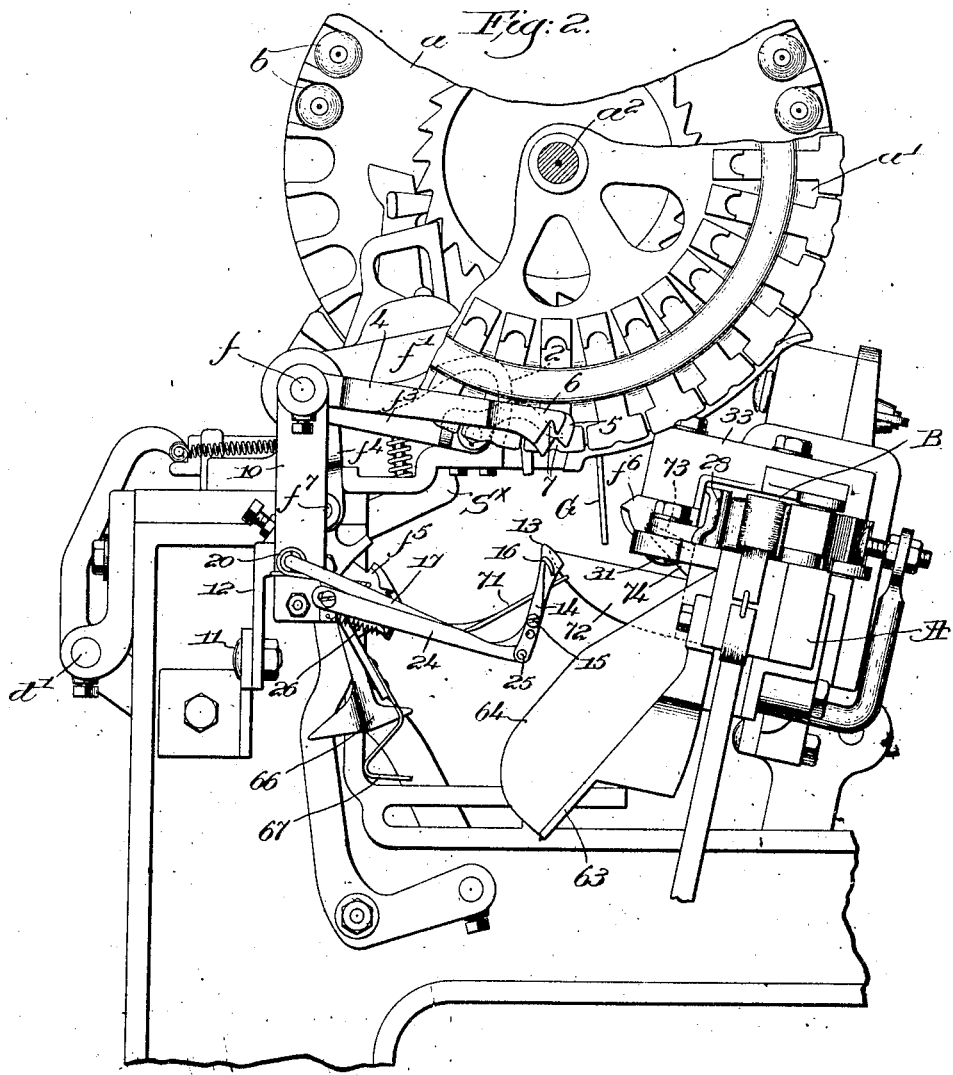
Witnesses,
Edward F. Allen.
Joseph M. Ward.
Inventors,
William F. Draper,
Jonas Northrop,
by Crosby Gregory.
Attys.

W. F. DRAPER & J. NORTHROP.
AUTOMATIC FILLING REPLENISHING FEELER LOOM.
APPLICATION FILED NOV. 21, 1907.
920,037.
Patented Apr. 27, 1909.
8 SHEETS—SHEET 3.
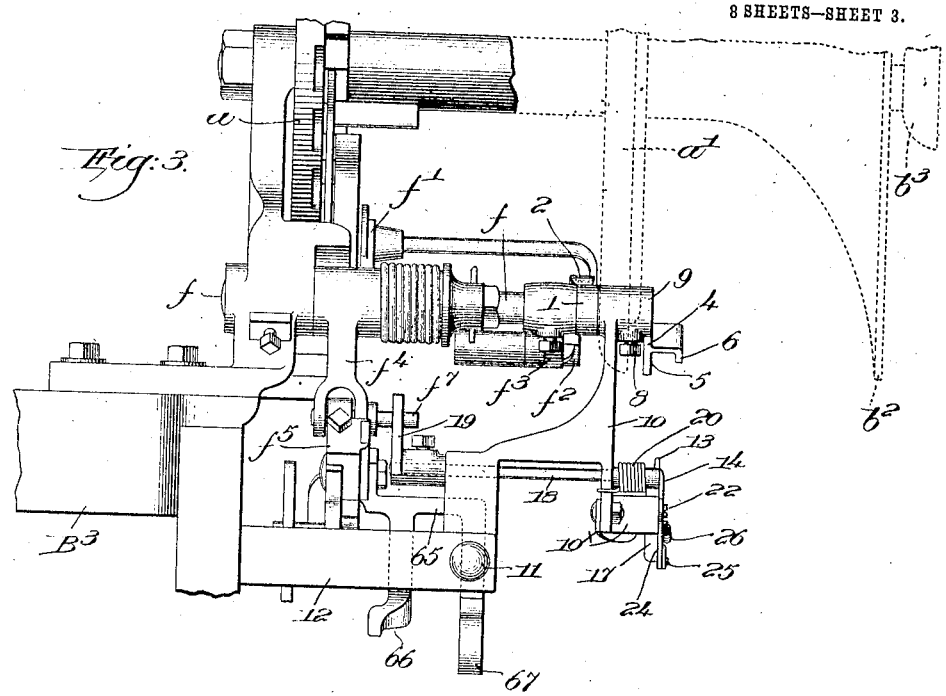

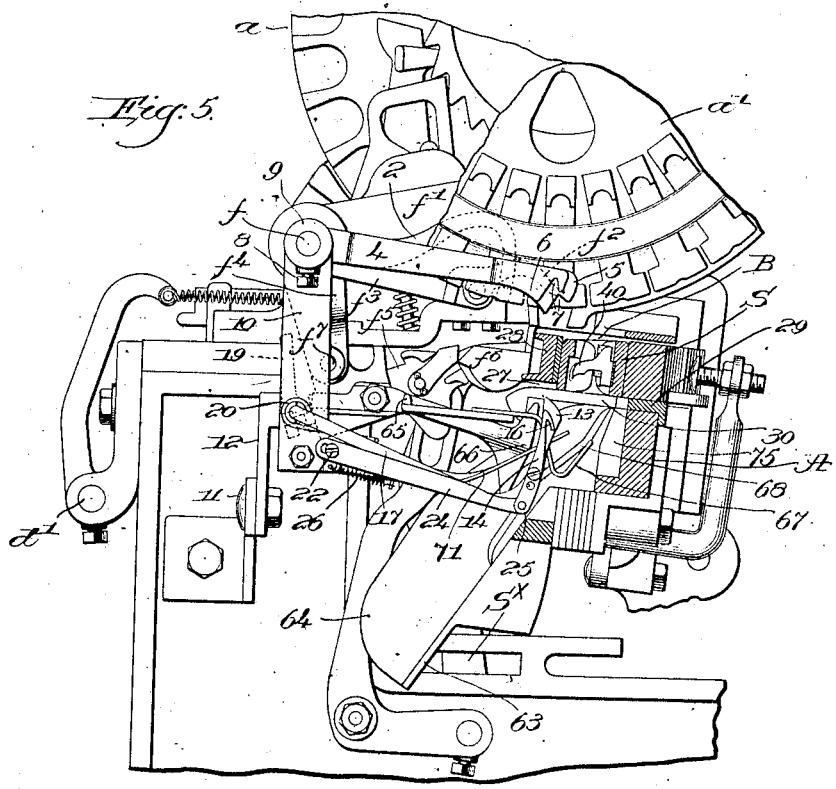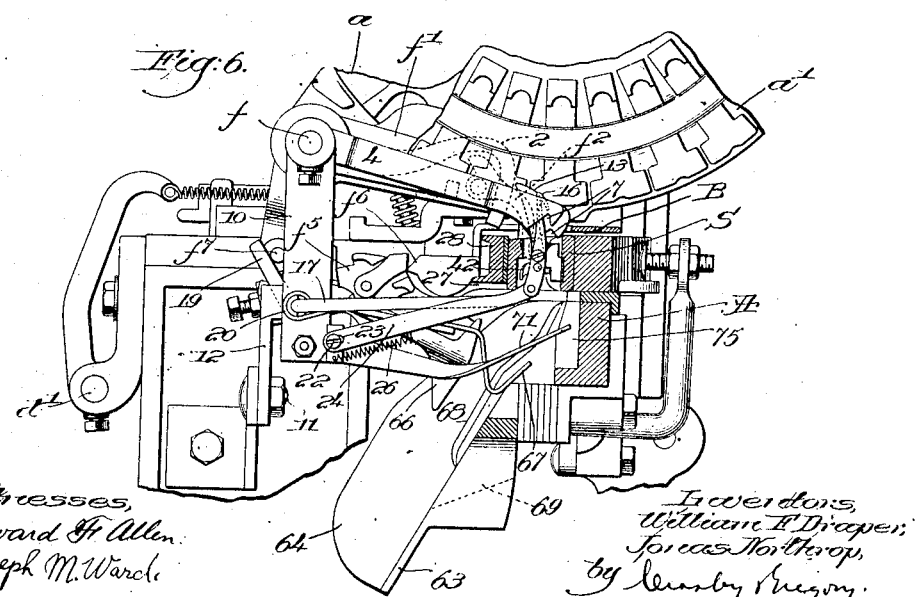

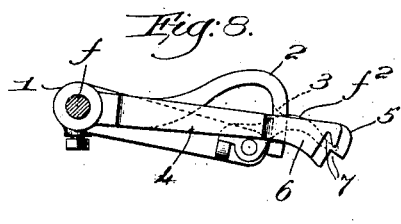
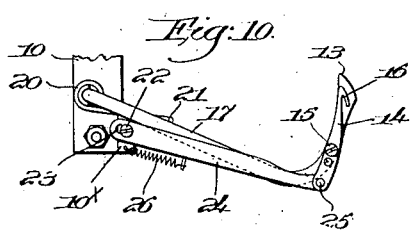
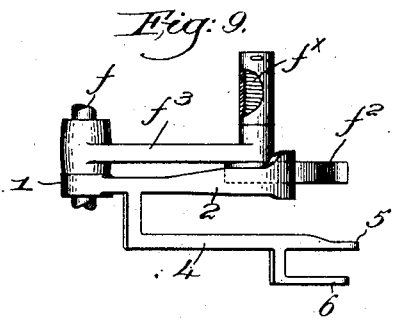
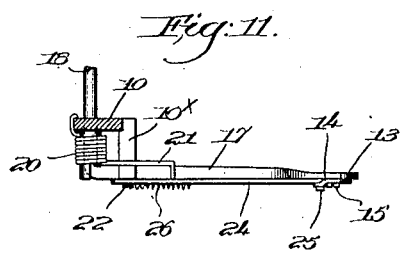
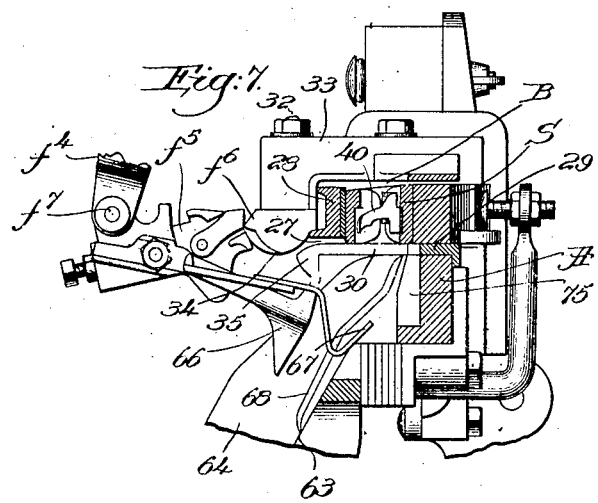
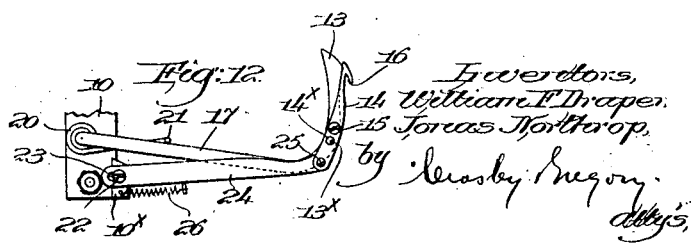

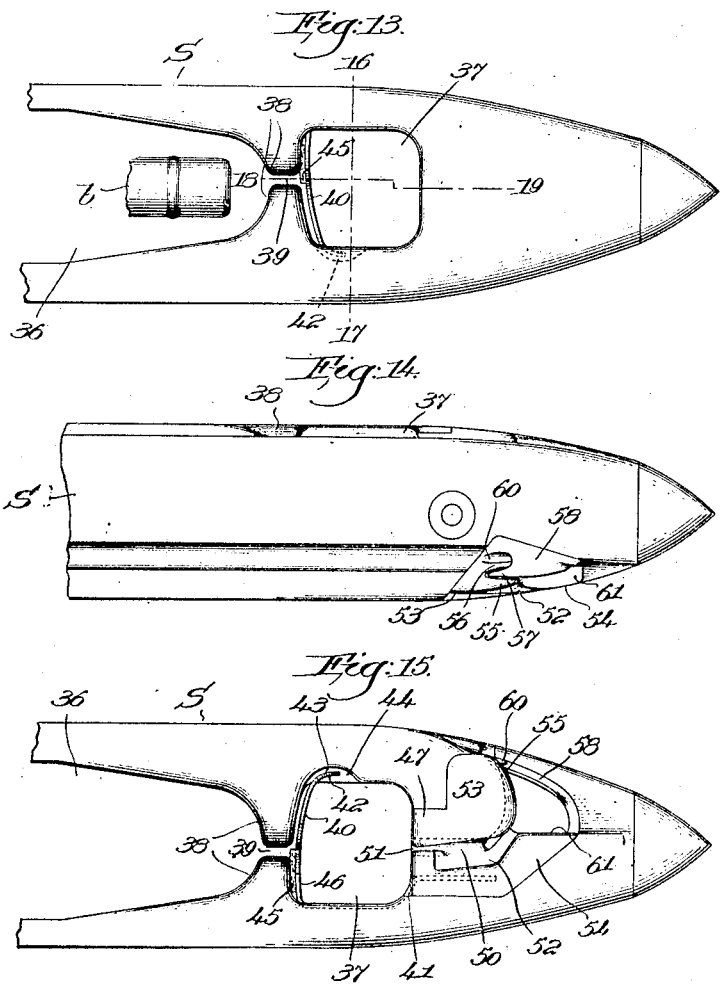
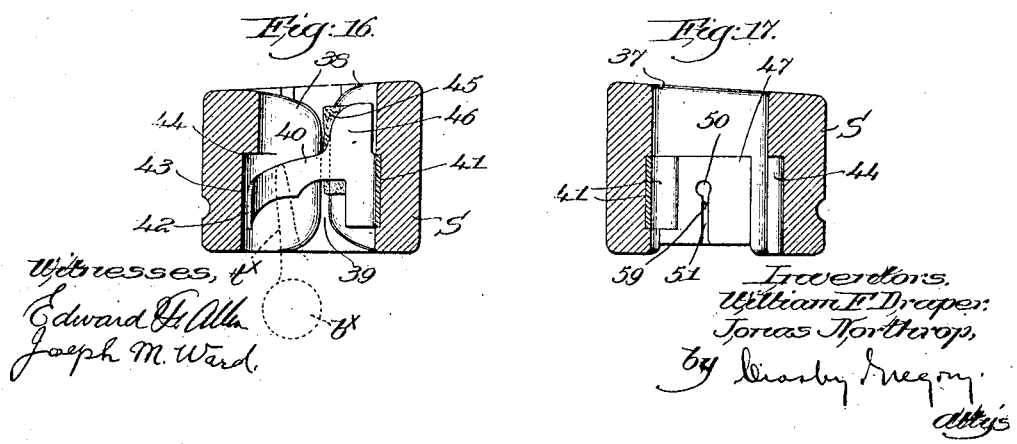

W. F. DRAPER & J. NORTHROP.
AUTOMATIC FILLING REPLENISHING FEELER LOOM.
APPLICATION FILED NOV. 21, 1907.
920,037.
Patented Apr. 27, 1909.
8 SHEETS—SHEET 7.
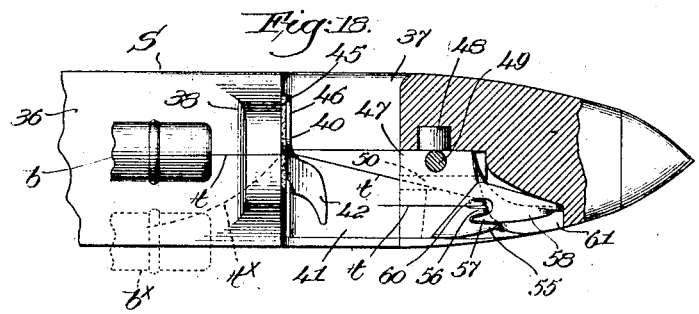
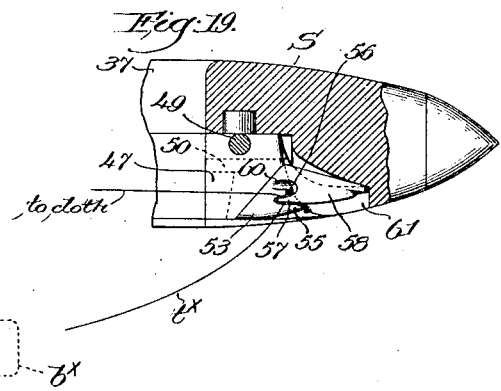
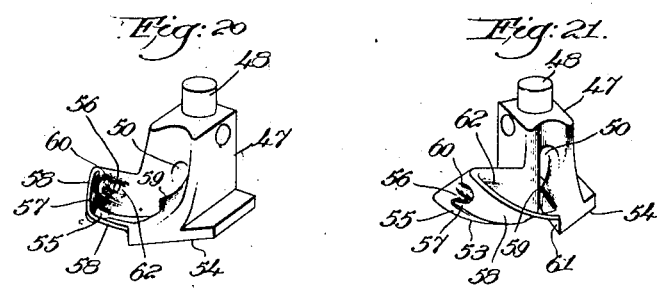
Witnesses,
Edward F. Allen.
Joseph M. Ward.
Inventors,
William F. Draper,
Jonas Northrop,
by Crosby Gregory
Attys.

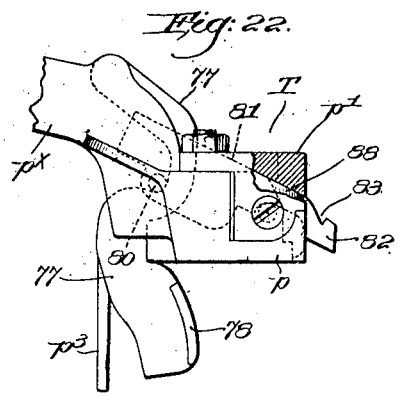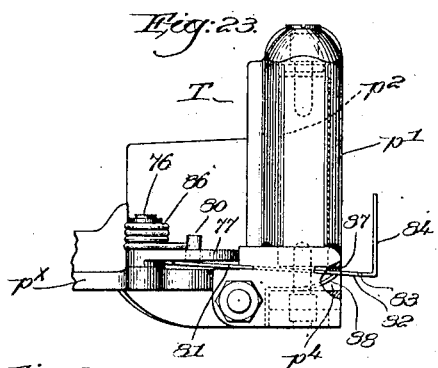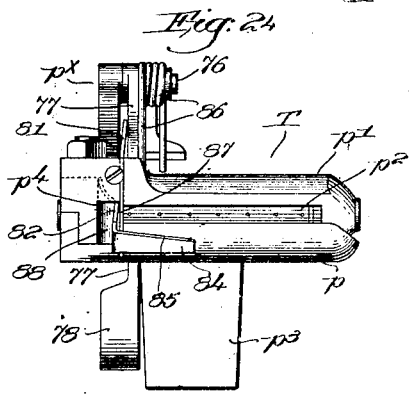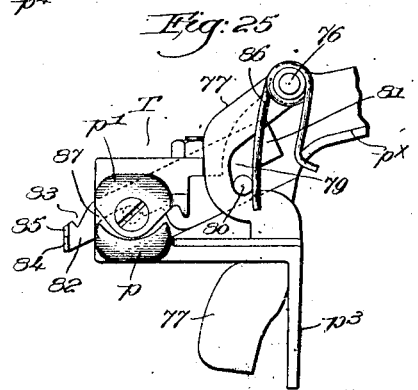

UNITED STATES PATENT OFFICE.

WILLIAM F. DRAPER AND JONAS NORTHROP, OF HOPEDALE, MASSACHUSETTS, ASSIGNORS TO DRAPER COMPANY, OF HOPEDALE, MASSACHUSETTS, A CORPORATION OF MAINE.

AUTOMATIC FILLING-REPLENISHING FEELER-LOOM.

No. 920,037.  Specification of Letters Patent.  Patented April 27, 1909.

Application filed November 21, 1907. Serial No. 403,111.

*To all whom it may concern:*

Be it known that we, WILLIAM F. DRAPER and JONAS NORTHROP, citizens of the United States, and residents of Hopedale, county of Worcester, State of Massachusetts, have invented an Improvement in Automatic Filling-Replenishing Feeler-Looms, of which the following description, in connection with the accompanying drawing, is a specification, like characters on the drawing representing like parts.

This invention relates to looms provided with mechanism to replenish automatically the running or working shuttle with a fresh supply of filling prior to complete exhaustion of the running filling, the substantial exhaustion of the supply of filling in the shuttle being detected by or through suitable filling-exhaustion indicating mechanism. Upon such detection the actuation of the filling-replenishing mechanism is effected automatically.

Looms of this type are technically termed "feeler" looms because of the filling-feeler or detecting device forming a part of the exhaustion-indicating mechanism. Various examples of such looms are found in the art, differing from each other more or less as to structural details but the underlying principles of operation are substantially the same in all, the new or fresh filling being provided before the old or running filling is completely exhausted, thereby obviating the formation of one or more empty or partly-empty picks in the cloth. An automatically self-threading shuttle is used in such a loom, and means have been provided to sever the old and new filling-end adjacent the edge of the cloth, and also to sever the old filling-end between the cloth and the delivery-eye of the shuttle when the latter is in the replenishing shuttle-box, a part of the severing means usually being mounted on the shuttle-feeler common in such looms, as will be familiar to those skilled in the art to which this present invention pertains. If the old filling-end is carried back by the shuttle and woven into the cloth blemishes are made therein which are highly objectionable particularly in fine weaving and they must be removed or the value of the product is decreased.

One form of automatic filling-replenishing feeler-loom is shown in United States Patent No. 789471, granted to Wood & Northrop May 9, 1905 and the replenishing mechanism therein is substantially that shown in United States Patent No. 529940, granted to J. H. Northrop November 27, 1894 to which reference may be had, but so far as our present invention is concerned it is to be understood that it is not restricted to the detailed structure of either the filling-replenishing or exhaustion-indicating mechanisms shown in said patents, they having been selected merely as typical.

In a feeler loom, at the time the filling is changed or replenished the old filling-end extends from the filling-carrier or bobbin then in the shuttle forward through the delivery-eye of the shuttle and thence back to the cloth, and heretofore, if the shuttle is properly boxed for replenishment, a shuttle-feeler moves across the mouth of the shuttle-box, and a thread-cutter on the shuttle-feeler severs the old filling-end adjacent the mouth of the shuttle-box. This thread-cutter holds the severed filling-end at the cloth side, but drops it at the opposite or shuttle side, and when the spent bobbin is ejected it is depended upon to draw the severed filling-end backward through the delivery-eye and thence out of the shuttle, to clear the latter of the old filling. In actual practice, however, it is found that at times the ejection of the spent bobbin will not completely draw out or clear the old filling from the shuttle, which on the first pick after replenishment takes the old filling back into the shed and it is woven into the cloth. So, too, the thread-cutter on the shuttle-feeler does not always operate, and in such case the shuttle must and does carry a loop or bight of the old filling back into the cloth, not only making a blemish therein but also tending to prevent the proper threading of the fresh filling in the shuttle. If, on the other hand the feeler thread-cutter severs the running filling when replenishment is not effected a thin place or stripe is made in the cloth, this occurring when the shuttle acts through the feeler to prevent replenishment but for some reason the thread-cutter operates.

Our present invention has for its object the production of various novel features of construction, arrangement and operation in an automatic filling-replenishing feeler-loom, whereby the above-mentioned objections, and others to be referred to hereinafter, are obviated or eliminated.

Heretofore, so far as we are aware, the old filling-end has never been actually cast off or removed bodily and positively from the threading device on the shuttle, but it has always been drawn out lengthwise through the shuttle eye, and dependence has been placed upon the ejected bobbin, alone or assisted by something else, to draw the filling-end back through the eye and thereby clear the shuttle.

Should the filling-end unwind rapidly from the ejected bobbin it will not be drawn through the eye, and if the filling breaks at or near the bobbin a piece will hang from the shuttle, to be carried into the cloth or foul the threading device, or both.

One of the novel features of our invention is the provision of means whereby the old filling-end is absolutely and positively cast off and the shuttle completely unthreaded at the time of filling replenishment, the old filling being cast off bodily from the shuttle as distinguished from drawing the filling lengthwise through the delivery-eye. To enable this casting off or unthreading to be accomplished we have provided the bottom of the shuttle with a thread-directing device, to automatically direct or guide the fresh filling to the delivery-eye located at the side and adjacent the bottom of the shuttle, such directing device being so constructed that when the spent bobbin is ejected the old filling is bodily cast off from the bottom of the shuttle, leaving the shuttle absolutely free and clear.

The thread-inlet and guiding passages of the directing device leading to the delivery-eye of the shuttle open downward, so that there is no obstruction to the casting off or unthreading when the spent bobbin is ejected, the old filling-end being discharged from the bottom of the shuttle while the fresh filling is inserted at the top thereof.

Inasmuch as the incoming supply of filling is presented in substantially usual manner at the top, and the thread-directing device is at the bottom, of the shuttle it is impossible to introduce the incoming filling to the thread-directing device in the usual way, viz:—at the top of the shuttle, and accordingly we have devised novel and efficient means to effect automatically the necessary coöperation between the incoming filling and the thread-directing device to effect the threading of the shuttle, meaning by the term "threading" the introduction of the filling into the delivery-eye of the shuttle, through which the filling draws to be delivered.

The peculiar location of the thread-directing device enables the old filling to be cast off and the shuttle to be thereby instantly and positively unthreaded at the time of filling replenishment, eliminating all chance or possibility of the old filling-end being carried back into the cloth, and we also eliminate the thread-cutter on the shuttle-feeler. Such thread-cutter is unnecessary, because the old filling-end is bodily cast off from the shuttle, which latter is the only agency by which it can be carried back into the cloth, the old filling being severed adjacent the edge of the cloth by suitable means.

While the ejection of the spent filling-carrier or bobbin will of itself absolutely and positively effect the casting off of the old filling-end and unthread the shuttle, in the present embodiment of our invention the instrumentality which we have devised to automatically catch and introduce the new filling thread to the thread-directing device is so arranged that it may, and in practice will, engage the old filling-end and assist the ejected bobbin in the cast off operation. That is, the length of old filling between the spent bobbin and the thread-catching instrumentality is drawn out and cast off from the thread-directing device on the shuttle in the form of a loop or bight, as will appear hereinafter in the detailed description, but the ejected bobbin is an essential factor in the unthreading operation.

The foregoing and various other novel features of our invention will be fully described in the subjoined specification and particularly pointed out in the following claims.

Figure 1 is a top plan view, centrally broken out of a sufficient portion of an automatic filling-replenishing feeler loom to be understood, with one practical embodiment of our present invention applied thereto, the feeder of the replenishing mechanism being shown only in part, the shuttle being shown in the replenishing shuttle-box; Fig. 2 is a right hand side elevation of the loom shown in Fig. 1, but with the filling-end holder omitted and portions only shown of the connected plates constituting the feeder; Fig. 3 is a front elevation of some of the replenishing mechanism and parts operating in conjunction therewith at the time of replenishment; Fig. 4 is a front view of the lay at the replenishing side of the loom, showing the shuttle-box and a depending guide, to direct the ejected filling-carrier or bobbin; Figs. 5 and 6 are sectional details on the irregular line 5—6, Fig. 1, looking to the left, the parts in Fig. 5 being shown in the position assumed as the lay approaches front center and in Fig. 6 the parts are shown in the position assumed when the lay is at front center, it being supposed that the fresh filling has just been inserted in the shuttle; Fig. 7 is a sectional detail on the line 5—6, Fig. 1, but omitting the thread-positioning and thread-catching instrumentalities, to show more clearly other parts of the mechanism; Fig. 8 is a right hand side elevation of the thread-positioning device in its normal position; Fig. 9 is a top plan view thereof; Fig. 10 is a side elevation of the thread-catching instrumentality in its normal position; Fig. 11 is a top plan view thereof, and Fig. 12 a side elevation of said instrumentality at an intermediate point of its path of movement; Fig. 13 is an enlarged top plan view of the leading or thread-delivering end of the shuttle; Fig. 14 is a side elevation thereof; Fig. 15 is an under side view of the leading end of the shuttle; Fig. 16 is a transverse section on the line 16—17, Fig. 13, looking to the left, and Fig. 17 is a similar section, but looking to the right, Fig. 13; Fig. 18 is a partial longitudinal section on the line 18—19, Fig. 13, but showing the filling-support and the thread-directing device in elevation; Fig. 19 is a view similar to Fig. 18 but showing the old filling-end just about to be cast off; Figs. 20 and 21 are perspective views of the thread-directing device detached; Fig. 22 is a right-hand side elevation of the thread-cutting temple, shown at the right Fig. 1; Fig. 23 is a top plan view thereof; Fig. 24 is an elevation of the temple viewed from the back of the loom, and Fig. 25 is an enlarged side elevation of the temple.

Referring to the drawings, and particularly to Fig. 1, the lay A having at its right hand end a replenishing shuttle-box B, a shuttle-box B' at its opposite end, the front wall of the box having an opening $B^2$, the filling-feeder or hopper mounted on the breast-beam $B^3$ at the right hand side of the loom, said feeder comprising two connected and rotatable plates $a$, $a'$ supported on a stud $a^2$, and adapted to support a circularly arranged series of filling-carriers or bobbins $b$, the transferrer $f'$ mounted to rock on a fixed horizontal stud $f$, and the tip-support $f^2$ pivotally mounted on the rigid arm $f^3$ fast on the stud $f$ may be and are all substantially of well known construction common to the Northrop type of loom, and operate in a manner well known to those skilled in the art.

In Fig. 3, we have partly shown in dotted lines the bell-shaped disk $b^2$ over which the filling-ends are led from the tips of the filling-carriers in the feeder to the holding stud $b^3$, it being understood that the feeder is rotated step by step to present one filling-carrier after another into position to be removed by the transferrer $f'$ and inserted in the shuttle S, the latter having suitable means to detachably engage and hold the butt of a filling-in carrier in operative position. The depending end $f^4$ of the transferrer has pivotally connected therewith a dog $f^5$ (the particular construction thereof forming no part of our present invention), and adapted to be engaged by a bunter $f^6$ on the lay when filling-replenishment is to be effected, the pivot $f^7$ on which the dog is mounted extending laterally from the arm $f^4$ as best shown in Fig. 3. The movement of the dog into operative position in the path of the bunter $f^6$ is controlled by or through the operating or controlling rock-shaft $d'$, common to looms of the Northrop type, the rotative movement of said rock-shaft being effected by filling-exhaustion indicating mechanism, to be briefly referred to, to effect replenishment of the running filling before complete exhaustion thereof, and said rock-shaft is also arranged to be rocked by or through detection of filling-failure by the filling-detectors or forks F, G, Fig. 1, located at opposite sides of the loom.

The stud $f$, in our present invention, is extended a considerable distance beyond the hub of the transferrer, and has loosely mounted upon it the hub 1 of an arched arm 2 extended rearwardly and having in its downturned widened end a hole 3, see dotted lines Fig. 8, through which is extended the tip-support $f^2$, the latter being held in normal position shown in Figs. 8 and 9 by the usual spring $f^\times$, said tip support projecting under the tip of the leading filling-carrier of the series in the feeder.

The arm 2 carries a thread-positioning device, shown as a rearwardly extended flange 4 laterally offset from said arm 2, and bifurcated at its rear end to present forks 5 and 6, which are notched on their under edges at 7, Figs. 2, 5, 6 and 8, the bottom of the notch in the fork 5 being shown as somewhat lower down than the bottom of the notch in the arm 6 for a purpose to be described.

When the loom is in normal operation the thread-positioning means will be located as shown in Figs. 2, 5 and 8 above the path of the shuttle-box B, but so located that the notched forks may descend into the position shown in Fig. 6 at the time of replenishing. At such time, the forks are immediately over the leading end of the shuttle and in fact the fork 5 projects slightly into an opening in the shuttle, to be hereinafter referred to. Such depression of the thread-positioner is effected by the rocking movement of the tip-support $f^2$, as the filling-carrier is inserted in the shuttle, the descent of the tip acting to rock the tip-support into dotted line position Fig. 6, and by such change in its position, the arched arm 2 is swung downward, moving with it the thread-positioner.

At the time a filling-carrier is transferred from the feeder, the filling-end leads from the tip thereof to the disk $b^2$ and thence to the stud $b^3$, viewing Fig. 3, and when the thread-positioner is moved as has been described, the notches 7 straddle the filling-end between the plate $a'$ and the disk $b^2$, and depress said filling-end, holding it in position to be engaged by the thread-catching instrumentality to be described. After replenishment of the filling, the thread-positioner returns to normal position. The stud $f$ beyond the hub of the arm 2 has fixedly secured to it by a set screw 8 the hub-like boss 9 of a depending bracket 10 bolted at 11 to a horizontally extended stand 12 rigidly secured to the loom side, see Figs. 2, 3, 5 and 6.

The thread-catching instrumentality is mounted on the bracket 10 and comprises two pivotally connected thread-engaging members 13 and 14, the latter being pivoted at 15 to the former and having its upper end downwardly hooked at 16. The member 13 in the present embodiment of our invention forms the upturned flattened end of a swinging carrier 17, secured to or forming part of a horizontal rock-shaft 18 mounted in suitable bearings in the bracket 10 and having adjustably secured to its inner end an upturned finger 19 in front of the lateral stud $f^7$ hereinbefore referred to. The carrier 17 is depressed by a spring 20 coiled about the outer end of the shaft 18 and made fast at one end, the free end 21 of the spring bearing on the top of the carrier. The normal position is clearly shown in Figs. 1, 3, 5 and 10. The bracket 10 has a lateral foot $10^\times$ below the carrier 17, and provided with a headed stud 22 extended through a longitudinal slot 23 in a controller shown as a link 24 rearwardly extended and pivotally connected at 25 to the lower end of the thread-engaging member 14, a spring 26 normally acting to draw the controller to the left, Figs. 10 and 12, to maintain the rear end of the slot 23 against the stud 22.

Referring to Figs. 10 and 12, the member 14 is shown as provided with a hole $14^\times$ entered by a small pin $13^\times$ on the member 13, so that a limited rocking movement of the member 14 is permitted. One extreme of such movement is shown in Figs. 2 and 10, and the other extreme is shown in Figs. 6 and 12. When the thread-engaging members are in the relative position shown in Figs. 2 and 10, the hook 16 is moved forward and is hooded or shielded by the wider face of the member 13; while in the other position, Figs. 6 and 12, the hook is exposed and is free to catch a thread. The member 14 is made of spring metal and is slightly flexed, so as to bear with a yielding or spring action against the face of the member 13, to at times nip or clamp and hold between said members one or more filling-ends, as will be explained hereinafter. When the filling-replenishing mechanism is operated, the transferrer $f''$ descends and the arm $f^4$ connected therewith moves outward or toward the front of the loom, the stud $f^7$ being at such time brought into engagement with the finger 19, and tilting it from the position shown in Fig. 5 to that shown in Fig. 6. This tilting of the finger turns the rock-shaft 18 and elevates the carrier 17 into the position shown in Fig. 6.

As the carrier moves upward, starting from the position shown in Fig. 10, the differential movement of said carrier and the controller 24 operates gradually to rock the member 14 on its pivot 15, from the normal position into the position shown in Fig. 6, the path of movement of the upper ends of the thread-engaging members being between the forks 5 and 6 of the thread-positioner and with the hook 16 above the fresh or new filling-end, at such time depressed by the positioner and held by the notches 7.

When the carrier 17 is moving from the position shown in Fig. 10 to that shown in Fig. 12, the controller 24 is not shifted longitudinally with relation to its fulcrum 22, being held from such shifting by the spring 26, so that the thread-catching members rise in open position, such opening movement being limited by the coöperation of the pin $13^\times$ and slot or hole $14^\times$, but from the position Fig. 12 to that illustrated in Fig. 6, the controller does move longitudinally, the slot 23 permitting such movement, and thereby there is no change in the relative position of the thread-catching members. Upon the return of the thread-catcher from the position shown in Fig. 6, the hook 16 engages the new filling-end and draws it downward, and in the great majority of cases said hook will also engage and draw downward the old filling-end, that is to say the part of the old filling between the tip of the spent filling-carrier or bobbin and the eye of the shuttle, and after such engagement the thread-catching instrumentality arrives at the position shown in Fig. 12. Thereafter as the carrier 17 continues to descend, the controller 24 by the differential movement with respect to the carrier operates to swing the member 14 and to draw the filling-end or filling-ends between the adjacent faces of the two members 13 and 14, clamping the filling and holding it as long as the said members remain in such position.

Reference to the drawings will show clearly the different points about which the carrier and the controller move as fulcra, providing for the differential movement hereinbefore referred to. The movements of the thread-positioner and the thread-catcher to operative position are so timed that the new filling-end is positioned in readiness to be engaged by the thread-catcher substantially just before the latter reaches the position shown in Fig. 6, and the thread catching members descend through a well or opening in the shuttle as the lay begins its backward movement while the thread-positioner returns to its normal position by or through the return movement of the tip-support $f^2$. Heretofore the lay has been cut away at the bottom of the replenishing shuttle-box to permit the discharge of the spent bobbin when ejected from the shuttle, and in our present invention, the lay is similarly cut away, leaving the bottom of the shuttle-box B open. Herein, however, we have provided a longitudinal opening or clearance 27 at the bottom of the front wall 28 of the replenishing shuttle-box B, and the race plate 29 is cut out at the bottom of the replenishing shuttle-box as at 30, so that there is no obstruction to the clearance 27. The box-wall 28 is fixedly attached to the lay at its outer end by a bolt 31, Fig. 4, and at its inner end it is rigidly secured by a bolt 32 to an overhanging arm 33 secured to or forming a part of the top plate of the box, and rigidly mounted on the lay, the front end of the arm being downturned and laterally offset and suitably shaped to form the bunter $f^6$, as clearly shown in Fig. 4.

By reference to Figs. 4 and 7, it will be seen that the clearance 27 is not interrupted by the bunter, although the latter is located in front of such clearance near its inner end, the lower face of the bunter being convexed at 34, and the race plate 29 is provided with a forwardly extended projection 35 at the inner end of the cut-out portion 30, said projection 35 also having a convexed face, as shown, and for a purpose to be hereinafter referred to.

We have described the thread-positioning and thread-catching instrumentalities in connection with the replenishing mechanism, and the structure of the replenishing shuttle-box, as such features of our invention cooperate at the time of filling-change or replenishment, such features being made necessary by the peculiar and novel structure of the shuttle, which latter will now be described.

In the construction of the shuttle, we have had in view the complete and positive discharge or casting off therefrom of the old filling-end at the time of replenishment, so that by no possibility could such old filling-end or any part thereof be carried back into the cloth or left in the shuttle to foul or interfere with the new filling inserted at the time of replenishment, and in order to effect such cast off, the device on the shuttle to direct the new filling to the delivery-eye has been located at the bottom of the shuttle, so that the shuttle may be said to be threaded at the bottom. As the new supply of filling is introduced at the top of the shuttle, it was therefore necessary to provide an instrumentality to engage the new filling-end, draw it downward, and properly present it to the directing device on the shuttle, in order that as the latter is picked, after replenishing, the new filling shall be properly positioned to enter and coöperate with the directing device to be guided thereby to the delivery-eye. The thread-catching instrumentality hereinbefore described effects the downward movement of the new filling-end and positions it, as required, so that the shuttle will be threaded from the bottom, and as will appear hereinafter, the old filling-end is cast off or removed positively and bodily from the bottom of the shuttle.

The shuttle structure is shown in detail in Figs. 13 to 21 inclusive, the shuttle-body S having the usual elongated opening 36, to receive the filling-carrier or bobbin, and the forward or leading end of the shuttle-body is provided with an opening or well 37 extended completely through the shuttle, and separated from the bobbin-receiving opening or chamber 36 by a transverse wall or partition 38 slotted vertically from top to bottom at 39, the upper and lower edges of the partition or wall 38 being preferably convexed as best shown in Fig. 16.

A filling-support shown as a metallic plate 40 is fixedly secured at one side as at 41 to the side wall of the well 37 and extends transversely across the slot 39 and quite near the same, see Figs. 13, 15, and 18, the free end of the support being bent forward at 42, and downturned adjacent but at a slight distance from the opposite wall of the well, leaving a clearance 43, as shown in Figs. 15 and 16, the shuttle-body being undercut at 44, to form a species of housing for the depending end of the support.

Referring to Fig. 16, it will be seen that the upper edge of the support is gradually inclined from right to left, from a point at the right hand side of the slot 39 down to the tip of the part 42. In practice, a piece of flannel, felt or other suitable friction-producing material 45 is interposed between the adjacent part of the wall 38 and the enlargement 46 of the filling-support, such friction material at its upright edge extending somewhat across the line of travel of the filling as it is drawn through the slot 39 and over the upper edge of the support 40, when the filling is being delivered from the shuttle. When the filling is drawn forward, as it will be under normal conditions, it will be held at the proper height in the slot 39 by the transverse support, and cannot drop below it, but the peculiar shape and location of the support as described provides for the shedding or casting off of the old filling-end at the time of replenishment, permitting its escape downward through the clearance 43, when the spent bobbin is ejected from the shuttle, as will be explained. The shuttle-body is cut away at its bottom in front of the well 37 to receive the threading device, preferably made as a metallic block 47, having a lug 48 to fit into a suitable socket in the shuttle-body and held in place by a transverse screw-stud 49, Figs. 18 and 19, the block 47 having extended through it a thread-passage 50, at its rear end presenting a downturned and narrow entrance 51, Figs. 15 and 17. The block 47 is laterally extended at its base at opposite sides of the open bottom 52 of such thread-passage as at 53, 54, Fig. 15, the enlargement 53 having its forward edge curved and forming at the side a guard lip 55, a second guard lip 56 being formed above it, and into the concavity between the said lips projects a rearwardly extended beak 57 forming part of a horn 58 which extends from the side of the enlargement 53 forward to the tip of the opposite enlarged portion 54 of the base of the block 47. The wall of the thread passage at its front end above the enlarged portion 54 is shaped to present a prong 59, which prevents the dropping of the thread out of the thread passage 50 at the time the directing device is guiding the thread to the side delivery-eye 60, this delivery-eye being herein shown as formed in the casing of the thread-directing device, and located immediately above the guard lip 56.

Referring to Figs. 14, 18 and 19, it will be seen that the delivery-eye 60 is not only at the side of the shuttle-body, but it is also very near the bottom thereof, so that the thread or filling is delivered from the shuttle quite close to the raceway of the lay. When the fresh supply of filling is inserted in the shuttle and the new filling-end is positioned by the thread-positioner, previously described, the members 13 and 14 of the thread-catcher are moved upward through the well 37 in the shuttle (the latter then being properly positioned in the shuttle-box B), and the filling-end is gripped or clamped by the thread-catching members and is drawn downward through the well and across the filling-support 40, but there is no tendency at such time to shed the filling therefrom as it is sustained back of the support by the bobbin. The thread-catcher maintains its hold on the new filling-end as the shuttle is picked, and the end is broken between the thread-catcher and the disk $b^1$, but the filling is held in proper position to enter the inlet 51, and the open bottom 52 of the thread-passage 50, as the shuttle moves across the lay, and the thread is drawn up over the prong 59 as the shuttle continues its movement to the non-replenishing side of the lay, and under the edge of the horn 58, adjacent the upright face 61 of the enlargement 54. The filling thus laid is beaten in, and after the change of shed, the shuttle is again picked to the right or toward the replenishing box B, viewing Fig. 1, and the filling now draws backward, being guided by the horn 58, and over the guard lip 55, and beneath the beak 57, immediately slipping over the guard lip 56 and into the delivery-eye 60. The shuttle is now completely and permanently threaded, and delivery of the filling continues from the eye so long as the filling cannot escape from the eye because the guard lip 56 overhangs the beak 57, and the point of the beak is shrouded or protected by the upper and lower lips 56 and 55 over which the filling draws, so that once in the eye, it is impossible for the filling to escape therefrom during the normal operation of the shuttle. There is no opportunity for the filling to drop out of the narrow inlet 51, because the support 40 holds the filling up, and in the thread passage. When the fresh filling has been beaten in, the part extending from the selvage to the thread-catcher is severed by a temple thread-cutter located adjacent to selvage of the cloth, and this parting or cutting device will be referred to later.

Viewing Fig. 18, the filling $t$ is shown as it passes from the filling-carrier $b$ across the support 40 and thence through the well 37 to the thread passage 50 and around the front face of the enlargement 53, and out through the eye 60, the said face being somewhat concaved or grooved at 62 leading to the eye to more smoothly and accurately direct the thread to the eye.

In Figs. 5, 6 and 7, the filling-support 40 is shown, but owing to the small scale of said figures the other parts of the shuttle are not indicated by their reference characters. After the threading of the shuttle is completed, it cannot be unthreaded by any throwing forward of a loop of filling, because such a loop would be thrown forward out of the top of the well 37 and onto the perfectly plain and unbroken surface of the shuttle-body in front of such well, and would be eliminated by the delivery of the filling. Such a loop would not be thrown under the shuttle, as all loop-forming tendencies operate to throw it forward at the top of the shuttle. We thus eliminate an objectionable feature sometimes found to occur in the use of automatically self-threading shuttles, as heretofore constructed, where the filling-thread is directed to the delivery-eye by directing means located at the top of the shuttle, a loop when formed tending to catch over such device and causing breakage of the filling. As the filling is firmly held by the thread-catcher at the proper level with relation to the bottom of the shuttle, the introduction of the filling into the thread-passage of the directing or guiding device on the shuttle is accomplished very accurately and positively with a minimum liability to misthread at the time of replenishing, and as the complete threading of the shuttle is a practical certainty after the filling has once been introduced to the thread-passage 50, shuttle-misthreads are obviated by the construction set forth. When the shuttle is in the replenishing box, the filling-end extends from the edge of the cloth to the delivery-eye, thence through the thread-passage of the directing device and across the well 37 in the shuttle-body, and over the support 40 to the filling-carrier, and this condition obtains when a change of filling is to be effected.

The shuttle invented by us is constructed and arranged to cast off or shed from the shuttle positively and wholly the old filling-end by or through the ejection from the shuttle of the spent filling-carrier or bobbin, meaning thereby the one on which the filling has been exhausted to a predetermined extent.

When the bobbin is ejected from the shuttle, it passes therefrom down through the open bottom of the shuttle-box and onto a forwardly inclined pan-like guide 63, fixedly secured to the lay, and having a raised flange 64 at its inner edge, the tip of the ejected bobbin being shown in dotted lines at $b^\times$, Fig. 18, with the filling-end $t^\times$ shown in dotted lines as leading therefrom up to the support 40, and we have provided means to temporarily arrest or stop the ejected bobbin just below the shuttle-box, thereby preventing a quick drop which might break the old filling-end, and leave it in the shuttle, and furthermore such broken end would tend to twist or curl out of the way of the thread-catcher, so that it would be practically impossible for the latter to engage it. To effect the temporary arrest of the ejected bobbin, we have fixedly attached to the dog $f^3$ a laterally extended arm 65 having rigidly extended therefrom a butt-arrester 66 and a yielding tip-arrester 67, the relative location of the butt and tip arresters being best shown in Fig. 3. When the dog $f^3$ is moved into operative position, the lateral arm 65 is elevated and the arresting members 66 and 67 are positioned to engage the ejected bobbin at its butt, and also along its barrel nearer its tip, the guide 63 having formed upon it an elongated projection having upon its face a pad 68 so located that when the butt-arrester 66 is operatively positioned the ejected bobbin will be caught at or near its butt and held between the padded projection and the butt-arrester 66, as indicated in Fig. 4, the tip arrester 67 at such time pressing against the barrel of the bobbin and holding it against the guard 63 which latter is recessed at 69 to receive the yielding arrester 67 on the forward beat of the lay under normal conditions.

The old filling-end is shown at $t^\times$, Fig. 4, leading upward from the spent filling-carrier, which is shown in its arrested position, it being understood that at such time the bent end of the tip arrester 67 will be flexed by engagement with the bobbin. As the ejected filling-carrier descends it draws the filling-end $t^\times$ downward and forward, so that it slides along the inclined upper edge of the support 40 as shown in dotted lines Fig. 16, and finally drops or is drawn off or shed from the tip 42 of the support, and there being then nothing to retain it in the thread-passage, the filling-end drops out of such passage and just before complete cast off of the old filling-end from the shuttle the bight or loop formed by such old filling-end assumes substantially the position illustrated in Fig. 19, wherein it is shown as just about to escape from under the beak 57 between the guard lips 55 and 56. The old filling-end is thus cast off bodily and completely, and in a positive manner from the shuttle by or through the ejection of the filling-carrier therefrom. This cast-off is effected manifestly by the ejection of the filling-carrier from the shuttle, whether or not the thread-catcher engages the old filling-end, but as a matter of fact, in the operation of the mechanism the hooked end of one of the catching members will engage not only the new filling-end, but the old filling-end at time of replenishment, and both filling-ends will be clamped or held between the members 13 and 14, and they will be drawn downward as the thread-catcher returns to normal position, thus assisting the ejected filling-carrier in shedding or casting off the old filling-end from the shuttle. This cast-off of the filling-end is to be distinguished from a drawing-out of the filling-end longitudinally through the eye of the shuttle, for heretofore, so far as we are aware, the only way in which the old filling-end has been removed from the shuttle (when it was removed) has been by a longitudinal pull, and if the length of the filling-end was too great or the pull was insufficient, the filling was not removed from the eye and the movement of the shuttle after replenishment would be very apt to carry the old filling-end or piece of it back into the cloth to be woven thereinto.

Inasmuch as we have provided for the complete cast-off of the old filling-end from the shuttle, it will be obvious that under no circumstances and by no possibility can any part of such old filling-end be carried back into the cloth. The old filling-end is cast off before the new filling-end is presented by the thread-catching instrumentality to the thread-directing device on the shuttle. Hence there can be no fouling or commingling of the old and new filling-ends, and the grasping of the old filling-end by the thread-catcher obviates the use of a thread-cutter on the shuttle-feeler $S^\times$, Fig. 2, as the old filling extends from the edge of the cloth to the thread-catcher, so that on the next forward beat of the lay after replenishment, the old end will be severed adjacent the cloth by the temple thread-cutter. This simplifies the construction, and obviates certain objections which at times arise from the employment of a thread-cutter on the shuttle feeler. The backward movement of the lay releases the ejected filling-carrier and in such a way that when it drops its tip end is uppermost, this being due to the fact that at the beginning of the back stroke of the lay, the pressure between the pad 68 and the butt-arrester 66 is diminished, releasing the butt-end of the bobbin while the yielding or spring-acting arrester 67 still presses upon the portion of the bobbin nearer its tip. The butt-end of the bobbin being heavier swings downward, and when finally the bobbin is completely released, it drops, sliding along the guide 63 and the filling draws off from the tip, preventing any breakage of the filling, and enabling the ejected bobbin to do its part in casting off the old filling-end from the shuttle. The slow start of the bobbin when released after its temporary arrest affords ample time for the thread-catching instrumentality to operate, whereas if there were no arrest of the bobbin, its exceedingly rapid movement due to ejection would not afford time enough for the thread-catcher to properly grasp the filling-end, and the proper casting off of the filling-end from the shuttle might be interfered with.

The thread-catcher is closed when in its normal position, and the thread-engaging members 13 and 14 are opened as they are moved to operative position, as has been described, so that when the old and new filling-ends have been cut by the temple thread-cutter, they hang from the thread-catcher until the next movement of the latter to operative position. At such time the hanging ends are caught upon the toothed face 70, see Fig. 1, of an arm 71 fixedly secured to the part of the bracket 10, and extended rearwardly quite close to the path of movement of the thread-catcher. The removal of the hanging ends prevents any chance of their being caught in the picker stick or in other parts of the loom mechanism. By providing the clearance 27 at the front of the replenishing shuttle-box, the old filling-end, leading from the cloth to the shuttle-eye, is withdrawn with perfect freedom after the thread-catcher has grasped it and returns to normal position, and of course the new filling-end is drawn through the clearance 27 with equal freedom. As the clearance is at the bottom of the front wall of the replenishing box, there is no chance for the old filling-end to be drawn in between the front wall and the lower part of the shuttle side. The convexed under face 34 of the bunter $f^6$ facilitates the withdrawal of the filling-ends through the clearance, as they pass under the bunter on the backward movement of the lay. The projection 35 holds up the filling-ends, as they are withdrawn, and then sheds them over its convex surface. If for any reason the thread-catcher should miss the old filling-end, the latter will be drawn over the upper edge of a forwardly extended shelf or support 72 mounted on the lay at or near the mouth of the replenishing shuttle-box, the ejected bobbin drawing the filling-end over such support, so that as the lay comes forward on the next beat, the old end will be held up by the support 72 in proper position to be presented to and cut by the temple thread-cutter, just as it would be had it been held by the thread-catching instrumentality.

Above the shelf-like support 72, we have provided an overhanging and forwardly extended projection 73 having an inclined under edge 74, which edge acts upon the new filling-end to push it down below the adjacent filling-fork G, to thereby prevent any interference therewith, but the main object of this overhang is to keep the old and new filling-ends off the raceway of the lay after replenishing and before said ends are cut. That is to say, supposing both ends to have been grasped and held by the thread-catcher, then as the lay goes back, they will be withdrawn from the shuttle-box through the clearance 27, and will draw over the overhang 73, which of itself is upwardly and forwardly inclined, as best shown by dotted lines in Fig. 2. Then on the next forward beat of the lay, such filling-ends will be engaged by the inclined edge 74 of the overhang and will be pushed or pressed downward toward the top of the shelf-like support 72, but they will be positively and effectually kept off the raceway, even should the operation of the temple thread-cutter be delayed for two or three picks.

The lay A is recessed at 75 to avoid interference with the extremity of the toothed thread-removing member 71 when the lay beats up, the recess being well shown in Figs. 5 and 6.

The device for cutting the old and new filling-ends is mounted on the temple T, Fig. 1, at the side of the loom adjacent the replenishing mechanism, and while this severance of the filling may be effected by other temple thread-cutting devices we have devised one which is particularly effective, the construction being shown in the detail views of the temple in Figs. 22 to 25 inclusive. The pod $p$, fixedly secured to or forming a part of the shank $p^x$, the cap $p'$ and roll $p^2$ may be in general of substantially well known construction, with a depending heel $p^3$ to be struck by the lay, as it beats up.

Upon a lateral stud 76 on the shank is fulcrumed a depending actuator 77 provided at its lower end with a lateral enlargement 78, the front edge of the actuator being notched at 79, Fig. 25, to receive a stud 80 extended laterally from the shank 81 of the movable blade 82. The said blade passes through an opening $p^4$, Fig. 24, made in the pod and cap close to the outer end of the roll $p^2$, and its upper edge is notched at 83, the tip of the blade being bent laterally toward the inner end of the temple head, to form a thread director 84, the upper edge of such director being slightly inclined, as at 85, Figs. 24 and 25. As shown by dotted lines Fig. 25 the lower edge of the blade is cut out to clear the adjacent journal of the roll $p^2$. The free end of a spring 86 bears against the stud 80 and normally projects the blade beyond the temple head and also maintains the lower end of the actuator 77 in advance of the heel $p^3$, said spring being coiled around the pin 76 and having its other end held fast in suitable manner. A fixed upright blade 87 is held fast in the temple head at the inner side of the recess $p^4$, and a leaf spring 88 within said recess bears at its free end against the movable blade 82, maintaining it in such position that the two blades will operate in a shear-like manner to cut the filling.

It will be seen that the cutting action is effected immediately adjacent the outer end of the temple roll $p^2$, so that the end of thread left extending beyond the edge of the cloth is very short, and in practice it frequently occurs that no projecting end at all is left.

When the lay beats up the lower part of the actuator 77 is engaged and the actuator is swung on its pivot 76 to retract the blade 82 before the heel $p^3$ of the temple is engaged to effect the usual forward movement thereof with the lay, at the beat-up. Such retraction of the movable blade acts to sever a filling-end if the latter is at the time lying in the notch 83.

When the old and new filling-ends are to be severed, following filling-replenishment, they are presented to the notch while held by the thread-catcher, and the inclined edge 85 of the director 84 assists in leading the filling-ends to the notch, the support 72 also holding them up in the proper position to be acted upon by the cutting blades. The filling-end, or ends, after being received in the notch 83 will be promptly severed immediately thereafter by the retraction of the movable blade, as described.

The operation of the thread-cutter is positive and exact, and in practice both the old and new filling-ends will be severed on the first forward beat of the lay after replenishment of the running filling. As the old filling-end always extends from the cloth through the delivery-eye of the shuttle to the bobbin about to be ejected in a "feeler" loom, when replenishment is called for, the present invention is particularly designed for such looms, as has been stated, and so far as our invention is concerned any desired form of filling-exhaustion-indicating mechanism may be employed.

We have indicated in Fig. 1, merely for purposes of illustration, a mechanism substantially such as forms the subject matter of United States Patent No. 789,471 previously referred to, the feeler $86^\times$ entering the opening $B^2$ of the front wall of the box $B'$, Fig 1, and entering the shuttle whenever it is in such box. When the filling is exhausted to a predetermined extent a member $87^\times$ is moved into engagement with and swings a controller $88^\times$, extended through a cam-slot (not shown) in the end 89 of the tilting transmitter 90, to thereby elevate the inner end of the transmitter. A latch 91, pivotally connected with an upturned arm 92 on the rock-shaft $d'$, is moved by the tilting of the transmitter into position to be engaged by the head $w^\times$ of the weft-hammer W, and the latch is then moved forward, rocking the shaft $d'$ and effecting the operation of the replenishing mechanism in well-known manner. If the filling breaks the filling forks will effect the operation of the replenishing mechainsm in usual manner, and should the break occur outside the shuttle the ejection of the bobbin will act, either alone or in conjunction with the thread-catcher, to completely and positively cast off the broken end from the shuttle, so that the new filling will not foul with the old, nor can the latter be carried back into the cloth.

From the foregoing description it will be clear that our invention includes as principal features the use of a shuttle constructed and arranged to permit the effectual and complete cast off of the old filling-end from the shuttle upon ejection therefrom of the bobbin, which we believe to be broadly new; means to effect the complete threading of the shuttle by instrumentalities in part on the shuttle itself and in part wholly independent thereof, acting upon the new or fresh filling end; and means to arrest temporarily the ejected bobbin after its discharge from the shuttle, to avoid breakage of the old filling-end and also to afford sufficient time for it to be engaged and held by the thread-catching instrumentality.

Various changes in details of construction, arrangement and operation may be made by those skilled in the art without departing from the spirit and scope of our invention as set forth in the appended claims, one practical embodiment of such invention being illustrated in the accompanying drawings and described in the foregoing specification.

Having fully described our invention, what we claim as new and desire to secure by Letters Patent is:—

1. In a loom provided with automatic filling-replenishing mechanism, a shuttle provided with a bobbin compartment and an adjacent well, separated therefrom by a vertically-slotted partition, a filling-support extended across the slot from one side only of the shuttle, a threading device in the bottom of the shuttle in front of the well, and an instrumentality to engage the fresh filling-end at the time of replenishment and draw it down through the well, to thereby position the filling-end for coöperation with the threading device, the filling support sustaining the incoming filling in the slot while permitting the old filling-end to pass down the slot and be cast off the shuttle bodily when the spent bobbin is ejected therefrom.

2. In a loom provided with mechanism to replenish the running filling before complete exhaustion thereof, a shuttle adapted to contain a bobbin and having means to normally support the filling adjacent the delivery end of the bobbin and constructed to shed the old filling-end at the time of replenishment, a threading device in the bottom of the shuttle, and an instrumentality to engage the new filling-end in front of the supporting means and draw it through the shuttle to thereby position such filling-end for introduction to the threading device, ejection of the spent bobbin drawing the old filling-end from the supporting means and casting it off bodily from the threading device.

3. In a loom provided with mechanism to replenish the running filling before complete exhaustion thereof, a shuttle adapted to contain a bobbin and having means to normally support the filling adjacent the delivery end of the bobbin and constructed to shed the old filling-end at the time of replenishment, a threading device in the bottom of the shuttle, and an instrumentality to engage the old and new filling-ends at the time of replenishment and draw them through the shuttle, to thereby cast off the old filling-end from both the supporting means and the threading device and present to such threading device the new filling-end to effect threading of the shuttle automatically.

4. In a loom provided with mechanism to replenish the running filling before complete exhaustion thereof, a shuttle adapted to contain a bobbin and having means to normally support the filling adjacent the delivery end of the bobbin and constructed to shed the old filling-end at the time of replenishment, and an instrumentality to engage the old filling-end in front of the supporting means upon filling replenishment and to draw such filling-end down through the shuttle as the spent bobbin is ejected therefrom behind said supporting means, the latter shedding or casting off the intervening length of filling.

5. In a loom provided with mechanism to replenish the running filling before complete exhaustion thereof, a shuttle adapted to contain a bobbin and having a transverse partition vertically slotted in front of the tip of the bobbin, to guide the filling, a support crossing the slot and fixed at one side thereof, the free end of the support being downwardly and forwardly inclined, to shed the old filling and permit its passage downward out of the guide-slot when replenishment is effected, said support sustaining the incoming filling in the slot, and means to effect automatically the threading of the shuttle when a full bobbin is inserted therein.

6. In a loom provided with mechanism to replenish the running filling before complete exhaustion thereof, a shuttle adapted to contain a bobbin and having means to normally support the filling adjacent the delivery end of the bobbin and constructed to shed the old filling-end at the time of replenishment, a threading device in the bottom of the shuttle, having a thread-passage provided with an entrance at the shuttle bottom, a side delivery-eye, a horn to direct the filling thread to the eye, said horn terminating in a beak below the eye, and guard-lips between which the beak projects, to prevent escape of the running filling from the eye, said lips acting to cast off the old filling-end from the threading device when said filling-end is shed from the supporting means and pulled down out of the thread-passage through its open entrance by ejection of the spent bobbin, combined with an instrumentality to engage the new filling-end at the time of replenishment and draw it down upon the supporting means and through the shuttle, to position it for entrance to the thread-passage of the threading device.

7. In a loom, in combination, a shuttle to contain filling and having a delivery-eye, mechanism to automatically insert a fresh filling-carrier in the shuttle, means to direct the fresh filling to the shuttle eye to be delivered therefrom, and means rendered effective by or through ejection of the spent filling-carrier to permit cast off bodily of the old filling-end from the shuttle.

8. In a loom, in combination, a shuttle to contain filling and having a delivery-eye in its side and adjacent its bottom, mechanism to automatically insert a fresh filling-carrier in the shuttle and effect the ejection therefrom of the spent filling-carrier, a device in the bottom of the shuttle to direct the fresh filling to the eye to be delivered therefrom, and means rendered operative by or through ejection of the spent filling-carrier to permit cast off of the old filling-end from the bottom of the shuttle.

9. In a loom, in combination, a shuttle to contain filling and having a delivery-eye, mechanism to automatically insert a fresh filling-carrier in the shuttle and effect the ejection therefrom of the spent filling-carrier, means, including a device at the bottom of the shuttle, to direct the fresh filling to the eye to be delivered therefrom, and means to facilitate cast off of the old filling-end from the bottom of the shuttle when the spent filling-carrier is ejected.

10. In a loom, in combination, a shuttle to contain filling, mechanism operative automatically prior to complete exhaustion of the running filling to provide the shuttle with a fresh filling-carrier, and means coöperating with said mechanism to cast off bodily from the shuttle the bight of old filling extending between the cloth and the spent filling-carrier when the latter is ejected from the shuttle by the operation of said mechanism.

11. In a loom, in combination, a shuttle to contain filling, mechanism operative automatically prior to complete exhaustion of the running filling to provide the shuttle with a fresh filling-carrier, and means on the shuttle to permit the bight of old filling between the cloth and the spent filling-carrier to be discharged bodily from the shuttle when the spent filling-carrier is ejected therefrom by the operation of said mechanism.

12. In a loom, in combination, mechanism to automatically provide the running shuttle with fresh filling prior to complete exhaustion of the filling therein and to effect ejection of the spent bobbin and the shuttle, the whole constructed and arranged to completely and positively cast off the old filling automatically upon ejection of the spent bobbin.

13. The combination, in a loom, of a shuttle having in its bottom an automatically self-threading device, mechanism to automatically insert a fresh filling-carrier in the shuttle at its top and to eject the spent filling-carrier at its bottom, an instrumentality to engage and present the fresh filling-end to said threading device, and means to facilitate cast off of the old filling-end from the bottom of the shuttle upon ejection of the spent filling-carrier.

14. The combination, in a loom, of a shuttle having in its bottom an automatically self-threading device, mechanism to automatically insert a fresh filling-carrier in the shuttle at its top and to eject the spent filling-carrier at its bottom, an instrumentality to engage the old and new filling-ends and draw them down through the shuttle at the time of filling change, to facilitate cast off of the old filling-end bodily from the threading device and present to the latter the new filling-end, and a transverse filling-support on the shuttle having a clearance to permit the passage of the old filling-end therethrough when the spent filling-carrier is ejected from the shuttle.

15. In a loom provided with automatic filling-replenishing mechanism, a shuttle to contain a supply of filling and having a threading device in its bottom, an instrumentality independent of the shuttle to engage the new filling and present the same to the threading device, and a filling support on the shuttle constructed and arranged to permit the old filling-end to be cast off the shuttle at the time of filling replenishment.

16. In a loom provided with automatic filling-replenishing mechanism, a shuttle to contain a supply of filling and having a side delivery-eye and a directing device at the bottom of the shuttle to direct the filling to the eye, and an instrumentality wholly independent of the shuttle to engage the new filling at the top of the shuttle and draw it downward through the shuttle into position to coöperate with the directing device.

17. In a loom provided with automatic filling-replenishing mechanism, a shuttle to contain a supply of filling constructed and arranged to permit cast off bodily of the old filling automatically upon filling replenishment, an instrumentality independent of the shuttle to engage and position the new filling to be threaded, and a device on the shuttle to coöperate with the new filling when so positioned and automatically thread the shuttle.

18. In a loom provided with mechanism to automatically replenish the running filling prior to complete exhaustion thereof, a shuttle adapted to contain a bobbin, means on the shuttle to normally support the filling and to shed it when the spent bobbin is ejected from the shuttle, a threading device at the bottom of the shuttle, and an instrumentality controlled by or through the operation of said replenishing mechanism to engage the new filling and present it to the threading device, and to hold the filling-end when the shuttle is picked after replenishment.

19. In a loom provided with mechanism to automatically replenish the running filling prior to complete exhaustion thereof, a shuttle adapted to contain a bobbin, and provided with a delivery-eye and means, having a thread entrance at the bottom of the shuttle, to direct automatically the filling thereto, to thread the shuttle, and an instrumentality to engage the new filling and draw it downward through the shuttle and present it to the entrance of said directing means and to temporarily hold the filling after replenishment when the shuttle is picked.

20. In a loom provided with automatic filling-replenishing mechanism, a shuttle to contain a supply of filling, and shuttle-threading means, including a thread-positioner, a thread-catcher to take the filling thread therefrom and draw it down through the shuttle to position it for the threading operation, and a threading device on the shuttle at its bottom to receive the filling-thread when so positioned, the thread-catcher positively holding the filling when the shuttle is picked.

21. In a loom provided with automatic filling-replenishing mechanism, a shuttle to contain a supply of filling, and shuttle-threading means, including a thread-positioner, a thread-catcher to take the filling-thread therefrom and draw it down through the shuttle to position it for the threading operation, and a threading device on the shuttle at its bottom to receive the filling-thread when so positioned, the thread-catcher positively holding the filling when the shuttle is picked, combined with means to facilitate cast off of the old filling bodily from the shuttle when the spent bobbin is ejected therefrom.

22. In a loom provided with automatic filling-replenishing mechanism, a shuttle to contain a supply of filling, and shuttle-threading means, including a thread-positioner, a thread-catcher to take the filling-thread therefrom and draw it down through the shuttle to position it for the threading operation, and a threading device on the shuttle at its bottom to receive the filling-thread when so positioned, the thread-catcher positively holding the filling when the shuttle is picked, said thread-catcher also taking the old filling-end between the bobbin and the threading device on the shuttle and drawing it downward, combined with a thread-support on the shuttle adapted to shed the old filling-end by or through ejection of the spent bobbin, whereby such filling-end is cast off bodily from the shuttle.

23. The combination, in a loom provided with automatic filling-replenishing mechanism, of a shuttle adapted to contain a supply of filling and having a side delivery-eye adjacent its bottom, means open at the bottom of the shuttle to direct the filling into the eye, and an instrumentality independent of the shuttle to engage the filling-end above the shuttle upon filling replenishment and draw it downward through the shuttle to be introduced into the directing device, said instrumentality holding the filling-end when the shuttle is picked.

24. The combination, in a loom provided with automatic filling-replenishing mechanism, of a shuttle adapted to contain a supply of filling and having a side delivery-eye adjacent its bottom, means at the bottom of the shuttle to direct the filling into the eye, said means having a downwardly-open thread entrance, and an instrumentality independent of the shuttle and operative by or through filling replenishment to engage the new filling-end above the shuttle and draw it downward into position to enter the directing device when the shuttle is picked, the old filling-end being cast off the directing device downward by or through ejection of the spent bobbin from the shuttle.

25. The combination, in a loom provided with automatic filling-replenishing mechanism, of a shuttle adapted to contain a supply of filling and having a side delivery-eye adjacent its bottom, and a well back of the eye, a transverse partition between the well and the supply of filling and vertically slotted from top to bottom, a filling support within the well crossing the slot and having its free end down curved toward the front wall of the shuttle, means on the shuttle at the bottom thereof to direct the fresh filling to the eye, and an instrumentality operative upon filling replenishment to engage the fresh filling-end and draw it down into the slot across the support and thence out of the bottom of the well, to position such filling-end for entrance to the directing means when the shuttle is picked, ejection of the spent bobbin drawing downward the old filling-end over the free end of the support and effecting cast off of such filling-end bodily from the directing means.

26. In a loom provided with mechanism to replenish filling prior to complete exhaustion of the supply in the running shuttle, a shuttle having a delivery-eye and adapted to receive a fresh bobbin at its top and to discharge the spent bobbin at its bottom, means on the shuttle to sustain the running filling and direct it to the eye to be delivered therefrom, said means opening downward to permit the old filling-end to be cast off bodily by ejection of the spent bobbin, and means to temporarily arrest the spent bobbin below the shuttle when ejected therefrom.

27. In a loom provided with mechanism to replenish filling prior to complete exhaustion of the supply in the running shuttle, a shuttle having a delivery-eye and open from top to bottom, to receive a fresh bobbin, and permit ejection of the spent bobbin from the bottom of the shuttle, means partly on the shuttle to effect automatically the threading of the fresh filling in the delivery-eye, and means to temporarily arrest the ejected bobbin below the shuttle and thereby prevent breakage of the old filling-end, the ejection of the bobbin acting to bodily cast off the old filling-end from the delivery-eye and from the threading means on the shuttle.

28. In a loom provided with mechanism to replenish filling prior to complete exhaustion of the supply in the running shuttle, a shuttle having a delivery-eye and open at its bottom for ejection of the spent bobbin, means to receive the new filling-end at the bottom of the shuttle and introduce it to the eye, a thread catcher to engage the old and new filling-ends at the top of the shuttle and position the latter for introduction to said means when the shuttle is picked, ejection of the spent bobbin casting off bodily and completely the old filling-end from the shuttle while held by the thread-catcher, and a device to temporarily arrest the ejected bobbin to prevent breakage of the old filling-end and afford time for the same to be engaged by the thread-catcher.

29. In a loom, mechanism to automatically insert a fresh supply of filling into the running shuttle prior to complete exhaustion of the supply therein and to eject the latter, combined with a shuttle having a delivery-eye, means to introduce the fresh filling-end thereto automatically, and means to facilitate cast off of the old filling-end from the bottom of the shuttle upon the insertion of a fresh supply of filling thereto.

30. In a loom, mechanism to automatically insert a fresh supply of filling into the running shuttle prior to complete exhaustion of the supply therein and to eject the latter, combined with a shuttle having at its bottom a thread-directing device and a delivery-eye adjacent thereto, said device and eye permitting the old filling-end to be cast off therefrom bodily upon ejection from the shuttle of the nearly exhausted supply of filling, and means to temporarily arrest descent of such ejected supply.

31. In a loom, mechanism to automatically insert a fresh supply of filling into the running shuttle prior to complete exhaustion of the supply therein and to eject the latter, combined with a shuttle having at its bottom a thread-directing device and a delivery-eye adjacent thereto, said device and eye permitting the old filling-end to be cast off therefrom bodily upon ejection from the shuttle of the nearly exhausted supply of filling, and a thread-catcher to grasp automatically the fresh filling end and present it to the thread directing device as the shuttle is picked after filling change and to engage and draw downward the old filling-end at a point between the directing device and the nearly exhausted supply.

32. In a loom, mechanism to automatically insert a fresh bobbin into the running shuttle prior to complete exhaustion of the filling on the bobbin therein and to eject the latter, combined with a shuttle having at its bottom a thread-directing device and a delivery-eye adjacent, said device and eye permitting the old filling-end to be cast off therefrom bodily upon ejection of the spent bobbin, and means to temporarily arrest descent of the latter when ejected from the shuttle.

33. In a loom, mechanism to automatically insert a fresh bobbin into the running shuttle prior to complete exhaustion of the filling on the bobbin therein and to eject the latter, combined with a shuttle having at its bottom a thread-directing device and a delivery-eye adjacent, said device and eye permitting the old filling-end to be cast off therefrom bodily upon ejection of the spent bobbin, means to temporarily arrest descent of the latter when ejected from the shuttle, and a thread-catcher to grasp automatically the fresh filling-end and present it to the directing device on the shuttle as the latter is picked after filling change and to engage and draw downward the old filling-end when the ejected bobbin is arrested.

34. In a loom, mechanism to automatically insert a fresh bobbin into the running shuttle prior to complete exhaustion of the filling on the bobbin therein and to eject the latter, combined with a shuttle having at its bottom a thread-directing device and a delivery-eye adjacent, said device and eye permitting the old filling-end to be cast off therefrom bodily upon ejection of the spent bobbin, and means to temporarily arrest descent of the latter when ejected from the shuttle, said means thereafter releasing the butt first so that the filling-end will draw off from the tip of the bobbin when the latter is completely released.

35. In a loom, mechanism to automatically insert a fresh supply of filling into the running shuttle prior to complete exhaustion of the supply therein and to eject the latter, combined with a shuttle having at its bottom a thread-directing device and a delivery-eye adjacent thereto, said device and eye permitting the old filling-end to be cast off therefrom bodily upon ejection from the shuttle of the nearly exhausted supply of filling, a thread-catcher operated automatically upon change of filling to grasp and hold the old and new filling-ends and present the latter to the directing device as the shuttle is picked and to draw downward the old filling-end between the tip of the spent bobbin and said directing device, and means to arrest the ejected bobbin to enable the thread-catcher to properly grasp the old filling-end.

36. In a loom, mechanism to automatically insert a fresh supply of filling into the running shuttle prior to complete exhaustion of the supply therein and to eject the latter, combined with a shuttle having at its bottom a thread-directing device and a delivery-eye adjacent thereto, said device and eye permitting the old filling-end to be cast off therefrom bodily upon ejection from the shuttle of the nearly exhausted supply of filling, and a thread-catcher operated automatically by the replenishing mechanism to rise through the shuttle and engage the old and new filling-ends and thereafter descend out of the shuttle, to position the new filling-end for introduction to the directing device and assist the ejected bobbin to cast off the old filling-end.

37. In a loom, in combination, a shuttle to contain filling and having a delivery-eye, means to introduce automatically the filling to the eye from the bottom of the shuttle, and mechanism operative automatically prior to complete exhaustion of the running filling to provide the shuttle with a fresh filling-carrier, the whole constructed and arranged whereby the bight of old filling intermediate the cloth and the spent filling-carrier is cast off bodily from the shuttle upon ejection of such filling-carrier therefrom.

38. In a loom, in combination, a shuttle to contain filling and having a delivery-eye, means to thread the eye automatically from the bottom of the shuttle, mechanism to replenish the running filling prior to complete exhaustion thereof in the shuttle, and a support on the shuttle for the running filling, said support shedding the old filling-end when the latter is cast off the shuttle at its bottom by or through filling replenishment.

39. In a loom provided with mechanism to replenish the running filling prior to complete exhaustion thereof in the shuttle, in combination, a lay having a shuttle-box at the replenishing side and longitudinally open at the front, a shuttle to contain filling and having a side delivery-eye adjacent its bottom, and means to automatically thread the eye from the bottom of the shuttle, said means including a device to engage and draw downward the old and new filling-ends to position the latter for threading, the old filling-end being cast off bodily from the shuttle by or through ejection of the spent filling supply therefrom and being withdrawn from the shuttle-box through its front opening.

40. In a loom provided with mechanism to replenish the running filling prior to complete exhaustion thereof in the shuttle, in combination, a lay having a shuttle-box at the replenishing side and longitudinally open at the front, a shuttle to contain filling and having a side delivery-eye adjacent its bottom, means, including a thread-catcher, to automatically thread the eye from the bottom of the shuttle, said thread-catcher grasping the old and new filling-ends and drawing them down through the shuttle and out of the front opening of the box, to position the new filling-end for threading as the shuttle is picked and assisting in casting off the old filling-end from the shuttle upon ejection of the spent filling therefrom, and a thread-cutter to sever said filling-ends adjacent the cloth, the front opening of the box permitting free exit therefrom of both the new and the cast off filling-ends as the lay moves back after replenishment.

41. In a loom, a shuttle having a side delivery-eye and means in its bottom to direct the filling to said eye, mechanism to introduce a fresh supply of filling to the shuttle at its top, a positioner to engage and depress the new filling-end upon replenishment, a two-part thread-catcher adapted to pass up through the shuttle and engage the filling-end when depressed by the positioner and to thereafter draw said end down through the shuttle, and means to move the thread-catcher into operative position and open its members, and to close said members after engagement with the filling-end and return the thread-catcher to normal position with its members closed, to thereby hold the filling-end and present it to the directing means in the bottom of the shuttle as the latter is shot across through the shed.

42. In a loom, a shuttle having a side delivery-eye, and means in its bottom to direct the filling to said eye, mechanism to introduce a fresh supply of filling to the shuttle at its top, a positioner to engage and depress the new filling-end upon replenishment, a thread-catcher comprising a flattened member and a coöperating hooked member pivotally connected therewith, a swinging carrier on which the flattened member is fixedly mounted and a controller operatively connected with the hooked member and having a swinging movement, combined with means to swing said carrier and thereby move the thread-engaging members bodily upward through the shuttle to engage the filling-end depressed by the positioner and thereafter to retract the carrier and the thread-catching members to normal position, differential swinging movement of the carrier and the controller causing the catching members to open before the hooked member catches the filling-end and to thereafter close and clamp between the hooked and the flattened members the said end as the thread-catcher returns to normal position, actuation of the thread-catcher being effected by or through operation of the mechanism for replenishing filling.

43. In a loom, mechanism to replenish filling in the running shuttle, and a shuttle provided with a delivery-eye and with means at the bottom of the shuttle to direct the filling to the eye, combined with a positioner to engage and depress the new filling-end toward the top of the shuttle at the time of replenishment, thread-catching means movable automatically up through the shuttle to engage and hold the filling-end as depressed and thereafter withdraw the same through the shuttle, maintaining its hold upon the filling-end until the next replenishment, a device to automatically sever such held end adjacent the edge of the cloth, and a device to remove such severed piece of filling from the thread-catcher upon the next operation thereof.

44. In a loom provided with automatic filling-replenishing mechanism, a temple thread-cutter, a lay having a replenishing shuttle-box provided with a thread-exit at the bottom of its front wall, and a forwardly extended support on the lay, near the mouth of the box, combined with a shuttle having a delivery-eye, means at the bottom of the shuttle to direct the filling to the eye, and a thread-catcher to automatically engage and draw down through the shuttle the new filling-end and hold the same as the shuttle is picked after replenishment, the ejection of the spent filling-carrier from the shuttle effecting cast off of the old filling-end, the latter at such time being sustained by the forwardly-extended support on the lay in position to be acted upon by the temple thread-cutter.

45. A feeler loom having, in combination, automatic filling-replenishing mechanism, a shuttle having a delivery-eye at its side and constructed and arranged to be threaded from its bottom and to have the old filling cast off bodily upon filling replenishment, a device adapted to cut the filling-ends at the edge of the cloth, a filling-fork adjacent said device, a lay, and means thereon to coöperate with the old and new filling-ends and keep them off the lay raceway between replenishment and cutting of said ends, said means also depressing the new filling-end below and out of range of the filling-fork.

46. In a loom provided with automatic filling-replenishing mechanism, a shuttle to contain filling and having a delivery-eye and a device on the shuttle to direct the filling thereto, combined with an instrumentality operative upon replenishment to grasp the new filling and position it for coöperation with the directing device after the shuttle is picked.

47. In a loom provided with automatic filling-replenishing mechanism, a shuttle to contain filling and having a delivery-eye and a device on the shuttle to direct the filling thereto, and a device to cut the new filling-end after replenishment, combined with an instrumentality to automatically grasp the new filling and hold it in position to enter the directing device on the shuttle when the latter is picked and insure presentation of the filling-end to the cutting device.

48. The combination, in a loom, of a shuttle provided with a delivery-eye and means to direct the filling thereto, and mechanism to insert a fresh bobbin in the shuttle at its top and to eject the spent bobbin at its bottom, the whole constructed and arranged to effect cast off of the old filling bodily from the shuttle when the spent bobbin is ejected, and an instrumentality to grasp the fresh filling-end and hold it when the shuttle is picked after replenishment.

49. In a loom provided with mechanism to replenish the running filling prior to exhaustion thereof, a shuttle to contain a bobbin and having a thread-directing and delivering device, an instrumentality actuated by or through operation of the replenshing mechanism to engage and move the new filling and position it for coöperation with the directing and delivering device as the shuttle is picked, said device being constructed and arranged to permit positive and bodily cast off of the old filling-end from the shuttle when the spent bobbin is ejected therefrom.

50. The combination, in a feeler loom provided with automatic filling-replenishing mechanism, of a shuttle having a delivery-eye and provided with a bobbin chamber and a well back of the eye, a partition separating the well and chamber and slotted from top to bottom, a filling support crossing the slot and leaving a clearance at one end, means on the shuttle to direct the filling to the eye and including a thread-passage leading from the well and opening downward, ejection of the spent bobbin drawing down the old filling-end off the free end of the support and out of the downwardly open thread-passage, to effect complete cast off of such filling-end from the shuttle, and an instrumentality to engage the fresh filling-end and draw it down through the well into position to enter the thread-passage.

51. The combination, in a feeler loom provided with automatic filling-replenishing mechanism, of a shuttle having a delivery-eye and provided with a bobbin chamber having its front wall vertically slotted from top to bottom, a filling support crossing the slot and having one end free, to shed the old filling when the spent bobbin is ejected from the shuttle, means on the bottom of the shuttle to direct the filling to the eye and including a thread-passage opening downward, the old filling-end being discharged from such passage when the bobbin is ejected, and means to present the fresh filling to the thread-passage for insertion in the eye.

52. In a loom provided with mechanism to replenish the filling in the working shuttle prior to exhaustion of the running filling, in combination, a shuttle having a delivery-eye, means on the shuttle to direct the filling to said eye and to permit bodily cast off of the old filling upon ejection of the spent bobbin, a temple, cutting blades thereon, a device on one of the blades to guide the filling to the cutting point, a thread-catching instrumentality to engage the old and new filling-ends when filling is replenished and present them to the cutting blades, and means to operate said blades.

53. In a loom, in combination, a shuttle to contain filling and having a delivery-eye, and mechanism to eject a filling-carrier from the shuttle, the whole constructed and arranged to effect cast off bodily of the old filling-end from the shuttle when the filling-carrier is ejected therefrom.

54. In a loom, in combination, a shuttle to contain filling, mechanism to eject a filling-carrier from the shuttle, and means on the shuttle to permit the bight of filling between the cloth and the filling-carrier to be discharged bodily from the shuttle when the filling-carrier is ejected therefrom.

55. In a loom, in combination a shuttle to contain filling and having a delivery-eye, and mechanism to eject a filling-carrier from the shuttle, the whole constructed and arranged to effect cast off of the old filling-end from the bottom of the shuttle by or through ejection of the old filling carrier.

In testimony whereof, we have signed our names to this specification in the presence of two subscribing witnesses.

WILLIAM F. DRAPER.
JONAS NORTHROP.

Witnesses:
GEORGE OTIS DRAPER,
OLIVER H. LANE.